March 25, 1924.

W. GRUHN

PENDULUM BALL

Filed Jan. 31, 1923

1,488,202

Patented Mar. 25, 1924.

1,488,202

UNITED STATES PATENT OFFICE.

WILLIAM GRUHN, OF ROSLINDALE, MASSACHUSETTS.

PENDULUM BALL.

Application filed January 31, 1922. Serial No. 616,218.

*To all whom it may concern:*

Be it known that I, WILLIAM GRUHN, a citizen of the United States, and a resident of Roslindale, in the county of Suffolk and Commonwealth of Massachusetts, have invented certain new and useful Improvements in Pendulum Balls, of which the following is a full, clear, and exact specification.

The object of this invention is the construction of a pendulum ball which can readily be changed in weight, either to be made heavier or lighter. To this end I provide a hollow body into which can be secured any number of heavy plates, from none to the limit of the body's capacity, until the predetermined weight is obtained.

In the drawings forming part of this specification, Fig. 1 is a front elevation of a pendulum ball embodying my improvements. Fig. 2 is a rear elevation of the same, with a section of its back plate broken away. Fig. 3 is a sectional view on the line 3—3 in Fig. 4. Fig. 4 is a section on 4—4 in Fig. 3. Fig. 5 shows the threaded tube upon which the removable plates are mounted. Fig. 6 is a face view of one of the removable plates.

The pendulum ball 1 is substantially cylindrical in form, having a rectangular chamber 2 within it, closed at the rear by a disk 3 held in place by screws 4. Centrally through the cylindrical wall of the ball 1 is passed the pendulum rod 5, holes 6, 7 being provided therefor, and the ball being suitably retained in proper adjustment by means of nuts 9.

Between the walls pierced by the holes 6, 7 is fitted a tube 10 whose interior diameter is that of the rod 5 to permit the latter to pass freely through it, and whose outer surface is threaded for practically its entire length, as shown in Fig. 5. Upon this threaded tube is a nut 11, between which and the opposite surface of the chamber 2 are clamped a predetermined number of plates 12 preferably composed of lead, each plate having a hole 13 through it loosely fitting the tube, and made rectangular to fit the chamber.

The tube having been removed from the chamber 2, the predetermined number of heavy plates 12 are strung thereon, after which the tube and plates are slid into the chamber to present the interior of the tube in alinement with the holes 6, 7, and so to permit the rod 5 to be passed through the same. Either before or after the rod has been thus inserted, the nut 11 is turned by a suitable wrench until the plates 12 on the tube are tightly clamped in place between the nut and the opposite chamber-wall. A set screw 14 is inserted radially in the nut 11 to ensure against its loosening from its position. It is desirable to slightly flatten two opposite surfaces of the tube 10 near the end bearing the nut 11, in order to hold it from turning when the nut is being tightened, as at 15.

I prefer to provide a set screw 16 shown in Fig. 2, for the purpose of preventing the ball 1 from turning on the rod 5, the set screw passing inward far enough to engage the rod.

If a pendulum ball of minimum weight is desired, all the plates 12 can be omitted; if of maximum weight, the chamber 2 is supplied with all the plates it can receive. Between these two extremes, a variety of weights can be obtained equal to the number of plates inserted. By having the plates equal in weight to some predetermined unit, the desired weight of the ball can be quickly determined by the number of plates used, plus the constant weight of the non-removable parts.

To prevent the plates 12, which are preferably composed of lead, from being bent and indented by the nut 11, I have the outermost plate 17 made of some resistant metal, as brass or steel.

What I claim is:

1. A pendulum ball having a chamber therein, a plurality of flatly extended heavy elements fitted to said chamber, and means for releasably fastening said elements in said chamber.

2. A pendulum ball having a chamber therein, a plurality of metal plates fitted to said chamber, and means for clamping said plates firmly in said chamber.

3. A pendulum ball having a chamber therein open at the back thereof, a removable cover for the chamber opening, and numerous heavy elements of equal weight fitted to said chamber.

4. The combination of a chambered body, a rod penetrating the same, an externally threaded tube also penetrated by said rod and terminally fitting between the walls of said chamber, metal plates each having a hole loosely receiving said tube, and a nut turning on said tube for clamping said plates between itself and the opposite wall of said chamber.

5. The combination of a pendulum ball substantially cylindrical in shape having an approximately rectangular chamber and a hole centrally through each of two opposite walls thereof, a rod removably fastened in said holes, an externally threaded tube mounted on said rod and snugly fitting between said apertured walls, a nut turning on said tube, and a plurality of rectangular metal plates apertured to be entered by said tube and snugly fitting the side walls of said chamber.

6. The combination of a chambered pendulum ball, a threaded member terminally fitted between opposite walls of said chamber, a nut turning on said threaded member, and a plurality of plates each having an opening receiving said member, said nut serving to clamp said plates between itself and the opposite wall of the chamber.

In testimony that I claim the foregoing invention, I have hereunto set my hand this 29th day of January, 1923.

WILLIAM GRUHN.